Patented Mar. 18, 1941

2,235,638

UNITED STATES PATENT OFFICE 2,235,638

PROCESS OF PREPARING DERIVATIVES OF PYRIMIDINE

Otto Hromatka, Darmstadt, Germany, assignor to Merck & Co. Inc., Rahway, N. J., a corporation of New Jersey No Drawing. Application October 5, 1937, Serial No 167,399. In Germany October 9, 1936

9 Claims. (Cl. 260—251)

This invention relates to a process of preparing derivatives of pyrimidine.

The pyrimidine ring has been synthesized in various ways, among which may be mentioned those expressed by the following equations:

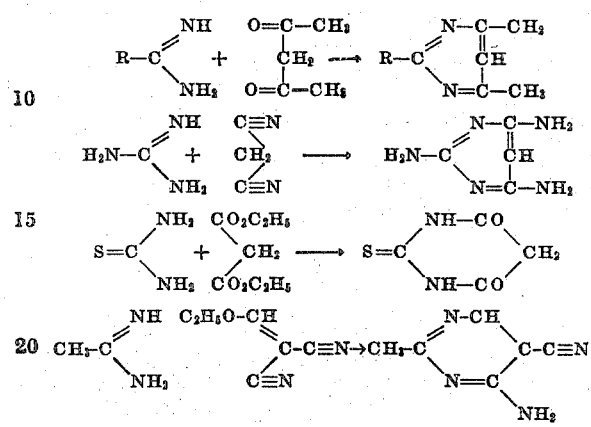

I have discovered a new method of preparing pyrimidine derivatives, and especially mono-oxy-derivatives, or derivatives free from oxygen. Such derivatives can be obtained by condensing an imido ether with a member selected from the group consisting of an ester, nitrile, aldehyde and ketone derived from amino methylene malonic acid. These malonic acid derivatives contain the groups

wherein each of the two end carbon atoms are linked to either a double bonded oxygen atom (combined as an ester or oxo-group), or a triple bonded nitrogen atom (nitrile group). Any of the known imido ethers may be used in the reaction.

The condensation is effected spontaneously when the free imido ether comes in contact with the malonic acid derivative in the presence of an inert solvent, preferably alcohol. If desired, a salt of an imido ether may be used, in which case the reaction commences as soon as the acid of such salt is neutralized. An excess of a base assists in the condensation. In the latter case, the condensation may be effected in the presence of water, but saponification of the imido ether should be avoided by maintaining mild reaction conditions.

The condensation of an imido ether with amino methylene malonitrile proceeds according to the following equation:

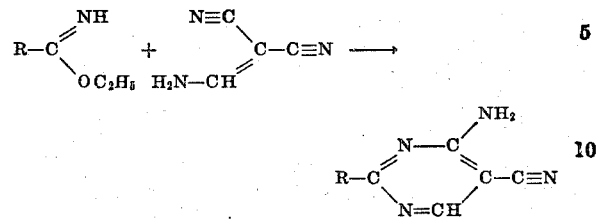

If an unsymmetrically formed derivative of malonic acid, for example aminomethylene cyanacetic acid ester, is used, the reaction may proceed in two different ways which can be expressed by the equation:

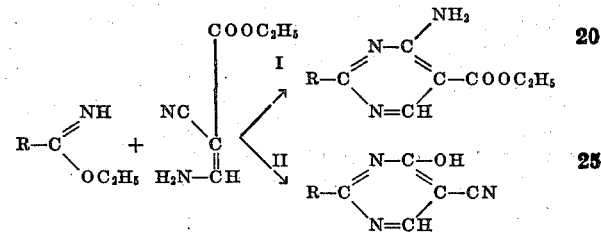

The synthesis may be conveniently carried out by starting with an alkoxymethylene malonic acid derivative, and forming the corresponding aminomethylene malonic acid derivative in the reaction solution, as illustrated in Examples 2 and 7. In such case, the reactants are preferably employed in molar proportions.

The compounds according to this invention are useful for many purposes, for example the 2-methyl-4-amino-5-cyanpyrimidine may be used in the synthesis of Vitamin $B_1$. Such pyrimidine derivative can be easily prepared according to this invention by condensing acetimido ether with amino methylene malonitrile, or ethoxymethylene malonitrile by converting the latter compound into the amino derivative.

The following examples illustrate various methods of carrying out my invention, but it is to be understood that these examples are given by way of illustration and not of limitation.

Example 1

A mixture of 124 g. of acetimide ethyl ether hydrochloride and 93 g. of aminomethylene malonitrile are well triturated in a mortar with 400 cc. of absolute alcohol, and 500 cc. of 2N alcoholic sodium hydroxide solution is gradually added. Sodium chloride separates out at first, but soon thereafter 2-methyl-4-amino-5-cyan-pyrimidine crystallizes out at a slightly elevated temperature, and is recovered at below 30° C. The crystals are dried with suction, washed with alcohol, and then with water to remove the sodium chloride. The yield is 118 g. or 88 per cent of theory.

*Example 2*

122 g. of ethoxy methylen malonitrile are suspended in 250 cc. of absolute alcohol, and 170 cc. of a solution of ammonia in absolute alcohol (1 cc. contains 0.1 g. of ammonia) are gradually added with cooling. 124 g. of acetimido ethyl ether hydrochloride are dissolved in this solution, and 500 cc. of 2N sodium hydroxide solution are then added. The solution is further worked as in Example 1, and 117 g. of 2-methyl-4-amino-5-cyanpyrimidine are obtained, which corresponds to 87.3 per cent of theory.

*Example 3*

12.4 grams of acetimino ethyl ether hydrochloride are added to 50 cc. of a 2N ethyl alcohol sodium ethylate solution. Sodium chloride separates out. Then a solution of 14 grams aminomethylenecyanacetic acid ethyl ester in 80 cc. hot absolute alcohol are added and boiled 2 hours under a reflux condenser. After standing for a long time the orange yellow solution of sodium chloride is drawn off by suction and evaporated to dryness in a vacuum. The crystallized residue is digested with aqueous diluted hydrochloric acid and filtered off from the undissolved part.

The filtrate is made ammoniacal and shaken out with methylene chloride. By evaporating the methylene chloride solution and recrystallizing the residue from absolute alcohol, about 5 grams of 2-methyl-4-amino-pyrimidine-5-carbonic acid ethyl ester, having a melting point of 124° C. are obtained.

*Example 4*

14 grams of aminomethylene cyanacetic acid ethyl ester are triturated with 30 cc. of absolute alcohol, and 18.6 grams of benzimino ethyl ether hydrochloride and 50 cc. of 2N alcoholic sodium ethylate solution are added. After standing for some time at room temperature the alcohol is evaporated off. The residue is made acid to Congo red with diluted hydrochloric acid. The insoluble part is drawn off by suction and recrystallized from alcohol and glacial acetic acid. The 2-phenyl-4-oxy-5-cyanpyrimidine which is obtained melts at 303°.

*Example 5*

12.7 grams of aminomethylene acetylacetone are triturated with 10 cc. of absolute alcohol and 18.6 grams of benzimino ethyl ether hydrochloride. After the addition of 50 cc. of 2N alcoholic sodium ethylate solution, it is boiled an hour under a reflux condenser. The orange colored solution is filtered off by suction and evaporated in a vacuum to one third of its volume. Platelets crystallize out, which, after recrystallization from absolute alcohol, melt at 105°. The yield amounts to 4 grams. The compound is 2-phenyl-4-methyl-5-acetylpyrimidine which yields a semi-carbazone, having a melting point of 230°.

*Example 6*

9.3 grams of aminomethylenemalonitrile are dissolved in 50 cc. of hot absolute alcohol and, after cooling, is mixed with 16.3 grams of phen-acetiminoethyl ether. The solution is allowed to stand at room temperature for a day and then the crystals which have formed are filtered off by suction. After recrystallization from alcohol, 2-benzyl-4-amino-5-cyanpyrimidine is obtained which melts at 177°. The yield amounts to 8.5 grams.

*Example 7*

122 grams of ethoxy-methylene malonitrile and 124 grams of acetimido ethyl ether hydrochloride are well mixed, and added to 340 cc. of a solution of ammonia in alcohol (1 cc. containing 0.05 gram of ammonia) and then 500 cc. of 2N sodium hydroxide solution is added. Condensation commences with gentle heating. After a few hours the mixture of crystalline 2-methyl-4-amino-5-cyanpyrimidine and sodium chloride is dried with suction and washed with alcohol, and then with water. The yield of the pyrimidine derivative is 115 g., or 86 per cent of theory.

Such high yield of 2-methyl-4-amino-5-cyanpyrimide is unexpected, as it might be supposed that the amino group would replace not only the alkoxy group of the malonitrile, but also the alkoxy group of the imido ether.

Modifications may be made in carrying out this invention without departing from the spirit and scope thereof, and I am, therefore, not to be limited to any specific reactants or condensation temperature, but only by the appended claims.

I claim:

1. The process of preparing derivatives of pyrimidine comprising condensing an imido ether with an amino derivative of malonic acid of the type

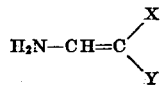

wherein X and Y are monovalent radicals selected from the group consisting of COOR, CN, COH, and COR, and wherein R is an alkyl radical.

2. The process of preparing derivatives of pyrimidine comprising condensing an imido ether with an amino derivative of malonic acid of the type

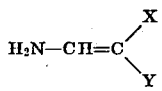

wherein X and Y are monovalent radicals selected from the group consisting of COOR, CN, COH, and COR, and wherein R is an alkyl radical, the said amino derivative of malonic acid being formed in the reaction solution from a corresponding alkoxy malonic acid derivative.

3. The process of preparing derivatives of pyrimidine comprising condensing an imido ether with an amino derivative of malonic acid of the type

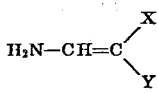

wherein X and Y are monovalent radicals selected from the group consisting of COOR, CN, COH, and COR, and wherein R is an alkyl radical, the said amino derivative of malonic acid being formed in the reaction solution from a corresponding alkoxy malonic acid derivative, and said reactants being present in molar proportions.

4. The process of preparing derivatives of pyrimidine comprising condensing acetimido-ethyl ether hydrochloride and aminomethylene malonitrile in the presence of an alkaline solution and an inert solvent.

5. The process of preparing derivatives of pyrimidine comprising reacting acetimino ethyl ether hydrochloride with an alcoholic solution of sodium ethylate, and condensing the acetimino ethyl ether reaction product with aminomethylene-cyanacetic acid ethyl ester in the process of an inert solvent.

6. The process of preparing derivatives of pyrimidine comprising condensing aminomethylene malonitrile with phenacetiminoethyl ether in the presence of an inert solvent.

7. The process of preparing derivatives of pyrimidine comprising condensing in molar proportions ethoxymethylene malonitrile, acetimidoethyl ether hydrochloride and ammonia in the presence of alkaline solution and an inert solvent.

8. A process for the manufacture of 2-methyl-4-amino-5-cyanopyrimidine comprising reacting acetiminoethylether with aminomethylene-malonitrile.

9. A process for the manufacture of 2-methyl-4-amino-5-cyanopyrimidine comprising dissolving aminomethylene-malonitrile and acetiminoethylether hydrochloride in absolute alcohol, then adding sodium alcoholate to such solution to convert said acetiminoethylether hydrochloride into the corresponding free base and allowing the resulting acetiminoethylether to react with said aminomethylene-malonitrile to form 2-methyl-4-amino-5-cyanopyrimidine.

OTTO HROMATKA.